US010572761B1

(12) United States Patent
Bastani et al.

(10) Patent No.: US 10,572,761 B1
(45) Date of Patent: Feb. 25, 2020

(54) VIRTUAL REALITY SYSTEM USING SUPER-RESOLUTION

(71) Applicant: GOOGLE LLC, Mountain View, CA (US)

(72) Inventors: Behnam Bastani, San Jose, CA (US); Eliezer Peli, Needham, MA (US)

(73) Assignee: GOOGLE LLC, Mountain View, CA (US)

( * ) Notice: Subject to any disclaimer, the term of this patent is extended or adjusted under 35 U.S.C. 154(b) by 88 days.

(21) Appl. No.: 15/997,891

(22) Filed: Jun. 5, 2018

Related U.S. Application Data

(60) Provisional application No. 62/515,114, filed on Jun. 5, 2017.

(51) Int. Cl.
*G06K 9/40* (2006.01)
*G06T 5/00* (2006.01)
*G06T 19/00* (2011.01)
*G06T 3/40* (2006.01)

(52) U.S. Cl.
CPC .............. *G06K 9/40* (2013.01); *G06T 3/4053* (2013.01); *G06T 5/002* (2013.01); *G06T 19/006* (2013.01)

(58) Field of Classification Search
CPC .......... G06F 3/017; G06F 1/163; G06F 3/011; G02B 2027/0134; G02B 27/017
USPC ............. 382/264; 345/419; 348/51, 745, 43, 348/E13.068
See application file for complete search history.

(56) References Cited

U.S. PATENT DOCUMENTS

| | | | |
|---|---|---|---|
| 9,535,249 B2 * | 1/2017 | Takeda | G02B 27/017 |
| 10,168,798 B2 * | 1/2019 | Tsang | G06F 3/02 |
| 10,229,540 B2 * | 3/2019 | Bavor, Jr. | G06F 3/013 |
| 10,452,227 B1 * | 10/2019 | Philbrick | G06T 19/003 |
| 2011/0169824 A1 * | 7/2011 | Fujinami | G09G 3/003 345/419 |
| 2013/0147911 A1 * | 6/2013 | Karsch | H04N 13/261 348/43 |
| 2014/0340492 A1 * | 11/2014 | Abe | H04N 9/3188 348/51 |
| 2017/0078645 A1 * | 3/2017 | Aurigema | H04N 13/254 |
| 2017/0180780 A1 * | 6/2017 | Jeffries | H04N 21/4307 |

* cited by examiner

*Primary Examiner* — Charlotte M Baker
(74) *Attorney, Agent, or Firm* — Brake Hughes Bellermann LLP (57) ABSTRACT

Displaying video in an HMD may include introducing unperceived noise to the video frame signal in order to enhance dynamic range. For example, each of a viewer's left and right eyes have a field of view (FOV) corresponding to a portion of pixels shown on the HMD. For each of these portions of pixels, the VR system may combine a noise signal (e.g., zero-mean Gaussian white noise) with the video signals corresponding to each of the portions of pixels. The introduction of such noise may improve the dynamic range of the viewer. Further, in some implementations, the noise signal that is combined with the left video signal may be slightly different from the noise signal that is combined with the right video signal. Such slightly different noise signals may provide further improvement to the image seen by the viewer due to binocular summation.

20 Claims, 7 Drawing Sheets

VIRTUAL REALITY SYSTEM USING SUPER-RESOLUTION

CROSS-REFERENCE TO RELATED APPLICATIONS

This application claims priority to U.S. Patent Application No. 62/515,114, filed on Jun. 5, 2017, entitled "VIRTUAL REALITY SYSTEM USING SUPER-RESOLUTION," the disclosure of which is incorporated by reference herein in its entirety.

TECHNICAL FIELD

This description relates to improving effective resolution in displays for virtual reality (VR) systems.

BACKGROUND

Virtual Reality (VR) and/or augmented reality (AR) can use head-mounted displays (HMDs) to provide the illusion of immersion for a human viewer in a virtual environment. To make the illusion realistic, the HMD provides as high a resolution and visual acuity within a display as possible. Such a realistic illusion can be achieved using a relatively high resolution display within a conventional HMD.

SUMMARY

In one general aspect, a method can include receiving, via controlling circuitry of a computer configured to output a video signal to a display, video frame data representing a video frame, the video frame having a first portion of pixels forming a first video signal and a second portion of pixels forming a second video signal, the first portion of pixels configured to be viewed in a first part of the display in a field of view (FOV) of a left eye of a viewer, the second portion of pixels configured to be viewed in a second part of the display in the FOV of a right eye of the viewer. The method can also include generating first noise data representing a first noise signal associated with each of the first portion of pixels and second noise data representing a second noise signal associated with each of the second portion of pixels. The method can further include performing, by the controlling circuitry, a combination operation on the first video signal and the first noise signal to produce a first combined signal and on the second video signal and the second noise signal to produce a second combined signal. The method can further include producing, via the controlling circuitry, the first combined signal for the first part of the display and the second combined signal for the second part of the display, thereby increasing a dynamic range by introducing high-frequencies in the first and second combined signals.

The details of one or more implementations are set forth in the accompanying drawings and the description below. Other features will be apparent from the description and drawings, and from the claims.

DETAILED DESCRIPTION

In accordance with the implementations described herein, improved techniques of displaying video in an HMD involve introducing unperceived noise to the video frame signal in order to enhance dynamic range. For example, each of a viewer's left and right eyes have a field of view (FOV) corresponding to a portion of pixels shown on the HMD. For each of these portions of pixels, the VR system may combine a noise signal (e.g., zero-mean Gaussian white noise) with the video signals corresponding to each of the portions of pixels. The introduction of such noise may improve the dynamic range of the viewer. Further, in some implementations, the noise signal that is combined with the left video signal may be slightly different from the noise signal that is combined with the right video signal. Such slightly different noise signals may provide further improvement to the image seen by the viewer due to binocular summation.

The methods and apparatus described herein can be particularly valuable in an HMD device using a mobile device with a mobile graphics processing unit (GPU). A mobile GPU may not be capable of producing high enough resolution (e.g., 10K per eye and an acuity better than 20/30 at about a 180-degree field of view (FOV) for a desirable virtual (e.g., immersive virtual, augmented virtual) experience. In other words, the resolution and acuity specifications for an HMD may not be feasible in the case of a VR system driven by a mobile GPU using a smartphone display. Such a mobile GPU may not have the computational power to manage the frame updates for such a large number of pixels. Accordingly, the techniques and apparatus described herein can be used to address these issues.

Figure 1:
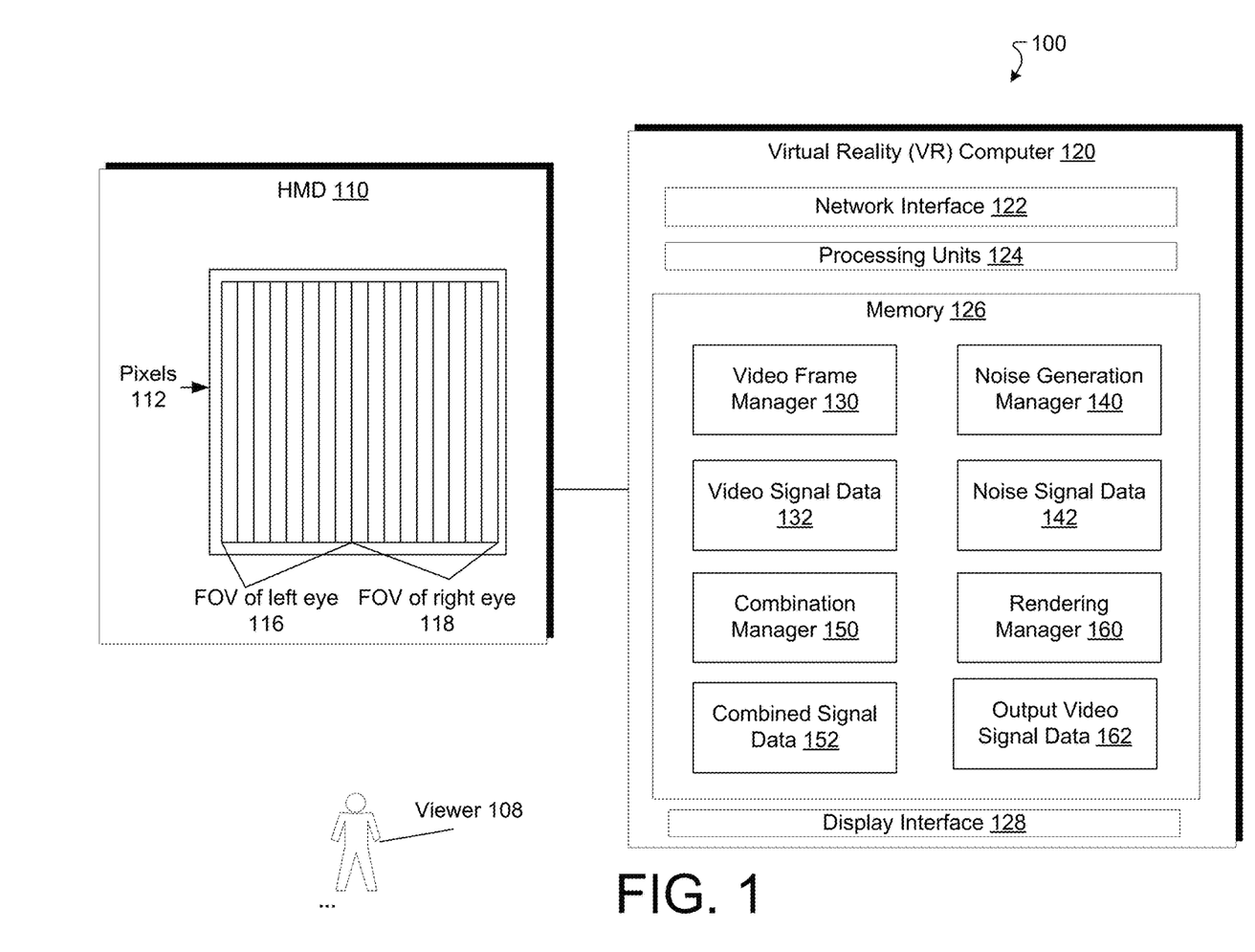
FIG. 1 is a diagram that illustrates an example electronic environment in which improved techniques described herein may be implemented.

FIG. 1 is a diagram that illustrates an example electronic environment 100 in which the above-described improved HMDs may be implemented. As shown, in FIG. 1, the electronic environment 100 includes a HMD 110 and a VR computer 120. As shown in FIG. 1, the HMD 110 is separate from the VR computer 120. In some implementations in which the VR computer 120 is a smartphone with an LCD screen, the HMD 110 is included within the VR computer 120. In some implementations, the VR computer 120 is directed to augmented-reality (AR) applications.

The HMD 110 is configured to display high-resolution video frames to a human viewer 108 to provide an immersive VR experience. In some implementations, the HMD includes a pair of goggles that holds a smartphone with a screen (e.g., a LCD screen). In some implementations, the HMD 110 includes standalone goggles connected to (e.g., via a cable or a network connection) the VR computer 120. The HMD 110 includes an array of pixels 112, e.g., LCD pixels. In some arrangements, the goggles include respective lenses for each of the left and right eyes of the viewer 108 to better image the video signal onto the eyes of the viewer 108.

The VR computer 120 is configured to provide a video signal to the array of pixels 112. The VR computer 120 includes a network interface 122, one or more processing units 124, and memory 126.

In some embodiments, one or more of the components of the VR computer 120 can be, or can include processors (e.g., processing units 124) configured to process instructions stored in the memory 126. Examples of such instructions as depicted in FIG. 1 include a video frame manager 130, a noise generation manager 140, a combination manager 150, and a rendering manager 160. Further, as illustrated in FIG. 1, the memory 126 is configured to store various data, which is described with respect to the respective managers that use such data.

The video frame manager 130 is configured to obtain video signal data 132. In some implementations, the video frame manager 130 obtains the video signal data 132 from a local source (e.g., a local disk drive, a flash drive, and the like). In some implementations, the video frame manager obtains the video signal data 132 from another computer connected to the VR computer 120 over a network. In some implementations, the video frame manager 130 obtains the video signal data 132 directly from a video camera.

The video signal data 132 includes arrays of pixel values that represent video frames. For example, a high-definition video frame has 1920 rows and 1080 columns of pixels. Each video frame is shown to a viewer at a time determined by the refresh rate of the HMD 110 (e.g., 60 Hz). In some implementations, the number of pixels in such a video frame has the same number of pixels in the array 112.

The noise generation manager 140 is configured to generate noise signal data 142 representing noise signals. In some implementations, the noise generation manager 140 generates the noise signal data 142 using a random number generator. In some implementations, the noise generation manager 140 is configured to generate the noise signal data 142 using output of a random process such as thermal noise, avalanche noise, environmental noise, quantum noise, and the like. In some implementations, the noise generation manager 140 is configured to generate a specified noise distribution. In some implementations, the noise generation manager 140 is configured to generate a zero-mean, white noise Gaussian of a specified variance. In some implementations, the noise generation manager 140 is configured to generate a non-Gaussian distribution (e.g., Poisson, Cauchy, etc.).

The noise generation manager 140 is configured to generate, for each video frame, noise signal data 142 for each of a first portion of pixels corresponding to the FOV of a left eye of the viewer 108 (i.e., first noise data) and a second portion of pixels corresponding to the FOV of a right eye of the user 108 (i.e., second noise data). In some implementations, the left noise data is slightly different from the right noise data. When the noise is different for the images seen by the left eye and the right eye of the viewer 108, the viewer 108 may experience an additional increase in perceived dynamic range. For example, the perceived image as seen by both eyes may have sharper boundaries than those in the respective image seen by the left or right eye alone.

The noise signal data 142 include noise values generated by the noise generation manager 140. There is a respective noise value corresponding to each of the pixels in each video frame represented by the video signal data 132. In some implementations, the noise values are generated according to a specified distribution (e.g., zero-mean Gaussian white noise). In some implementations, the specified distribution for a first portion of pixels corresponding to the FOV of a left eye of the viewer 108 (e.g., a first noise signal) is slightly different than that for a second portion of pixels corresponding to the FOV of a right eye of the viewer 108 (e.g., a second noise signal). For example, if the distribution is zero-mean Gaussian white noise, then the variance of the white noise corresponding to the first portion of pixels may be slightly different from the variance corresponding to the second portion of pixels. Further, the noise signal data 142 includes noise values corresponding to each video frame represented by the video signal data 132. In some implementations, noise values corresponding to a first video frame may be different from noise values corresponding to a second video frame.

In some implementations, a correlation between the first noise signal and the second noise signal is smaller than a threshold (e.g., 0.1, 0.05, 0.02, 0.01 and smaller). In some implementations, the correlation between the first noise signal and the second noise signal is zero or almost zero. An advantage of using such uncorrelated noise is that it is possible to combine a video signal with such noise in a binocular system much more aggressively than noise with a nonzero, or larger correlation.

The combination manager 150 is configured to perform a combination operation on the pixel values of the video signal data 132 representing a video frame and corresponding noise values represented by the noise signal data 142 to produce combined signal data 152. In some implementations, the combination operation includes summing pixel values and corresponding noise values. In some implementations, the combination operation includes a weighted sum of pixel values and corresponding noise values. In some implementations, the combination operation includes a Pythagorean sum (i.e., square root of a sum of squares) of pixel values and corresponding noise values.

The combined signal data 152 includes values of the combined signal to be sent to the HMD for display to the viewer 108.

The rendering manager 160 is configured to prepare the combined signal data 152 for display on the HMD 110 to produce output video signal data. For example, in some implementations, the number of pixels in such a video frame may have a different number of pixels in the array 112. In such a case, the rendering manager 169 is configured to interpolate the video signal data 132 such that each video frame has the same number of pixels as in the array 112. The rendering manager 160 is also configured to send the output video signal data 162 to the HMD 110 via the display interface 128.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the VR computer 120 can be configured to operate within a cluster of devices (e.g., a server farm). In such an implementation, the functionality and processing of the components of the VR computer 120 can be distributed to several devices of the cluster of devices.

The components of the VR computer 120 can be, or can include, any type of hardware and/or software configured to process attributes. In some implementations, one or more portions of the components shown in the components of the VR computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the VR computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the VR computer 120 (or portions thereof) can be configured to operate within a network. Thus, the components of the VR computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The network interface 122 includes, for example, Ethernet adaptors, Token Ring adaptors, and the like, for converting electronic and/or optical signals to electronic form for use by the VR computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the VR computer 120 can be, or can include, processors configured to process instructions stored in a memory. For example, a video frame manager 130 (and/or a portion thereof), a noise generation manager 140 (and/or a portion thereof), a combination manager 150 (and/or a portion thereof), and a rendering manager 160 can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the VR computer 120. As illustrated in FIG. 1, the memory 126 is configured to store various data, including video frame data 132 and time interval data 142.

Figure 2:
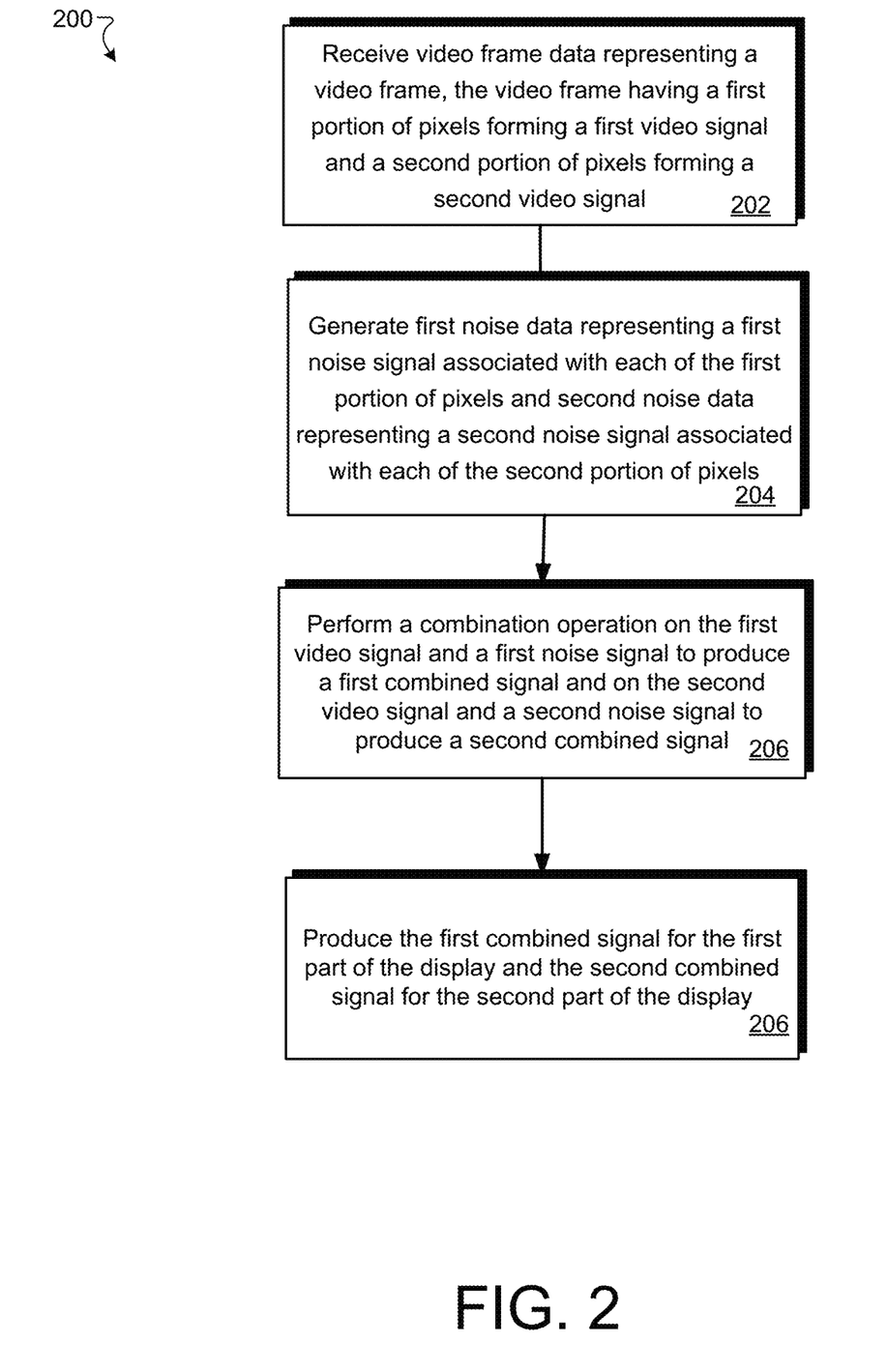
FIG. 2 is a flow chart that illustrates an example method of implementing the improved techniques as shown in FIG. 1.

FIG. 2 is a flow chart depicting an example method 200 of displaying video frames to a viewer via a HMD (e.g., HMD 110). The method 200 may be performed by software constructs described in connection with FIG. 1, which reside in memory 126 of the VR computer 120 and are run by the set of processing units 124.

At 202, the video frame manager 130 receives video frame data (e.g., video signal data 132) representing a video frame, the video frame having a first portion of pixels forming a first video signal and a second portion of pixels forming a second video signal. The first portion of pixels is configured to be viewed in a first part of the display in a field of view (FOV) 116 of a left eye of a viewer (e.g., viewer 108). The second portion of pixels is configured to be viewed in a second part of the display in the FOV 118 of a right eye of the viewer.

At 204, the noise generation manager 140 generates first noise data representing a first noise signal associated with each of the first portion of pixels and second noise data representing a second noise signal associated with each of the second portion of pixels.

At 206, the combination manager 150 performs a combination operation on the first video signal and the first noise signal to produce a first combined signal and on the second video signal and the second noise signal to produce a second combined signal.

At 208, the rendering manager 160 produces the first combined signal for the first part of the display and the second combined signal for the second part of the display.

Figure 3:
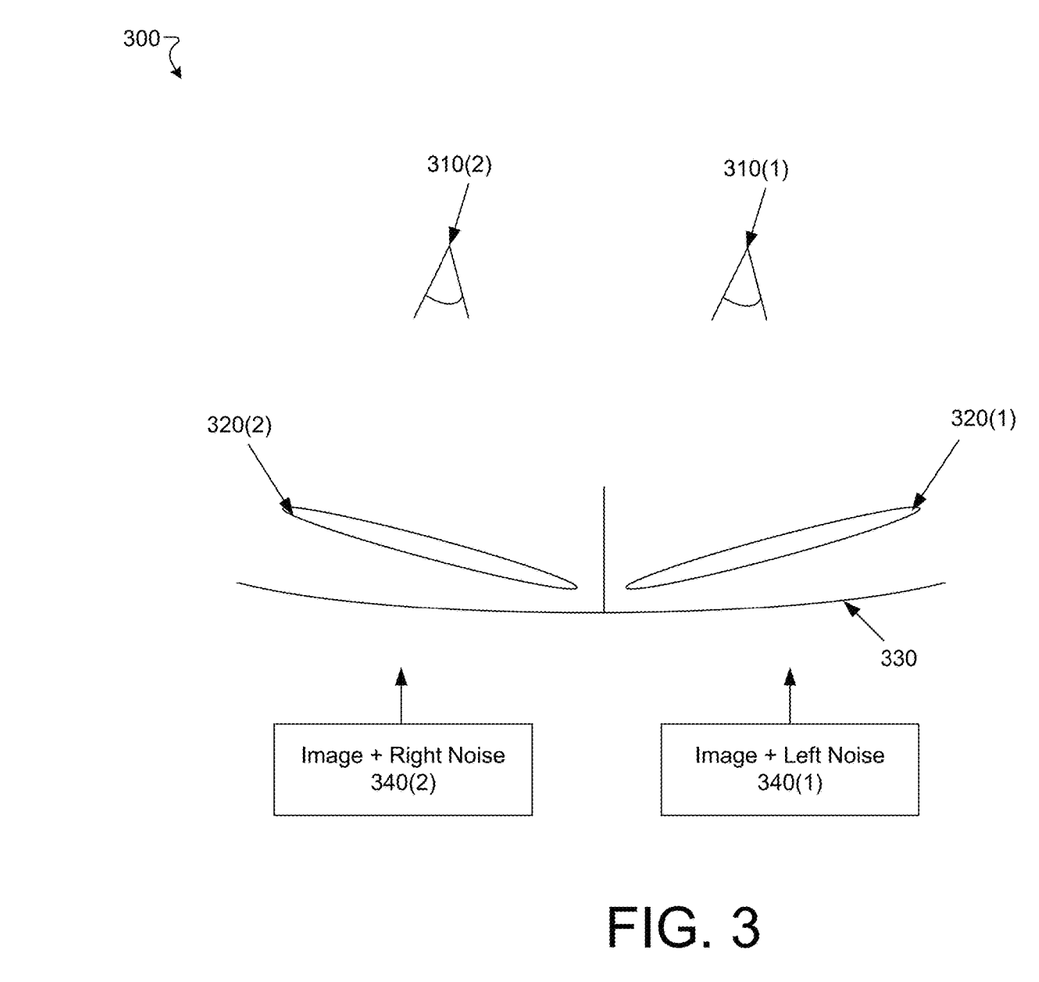
FIG. 3 is a diagram illustrating an example virtual reality (VR) system according to the improved techniques described herein.

FIG. 3 is a diagram illustrating a top view of an example VR physical environment 300. In the physical environment 300, a HMD 330 is split into two halves, each corresponding to a left eye 310(1) and a right eye 310(2) of a user. The HMD 330 as shown in FIG. 3 includes respective lenses 320(1) and 320(2) configured to focus a first portion of a combined signal (i.e., a video signal+left noise) 340(1) onto a retina of the left eye 310(1) and a second portion of a combined signal (i.e., a video signal+right noise) 340(2) onto a retina of the right eye 310(2). In the arrangement shown in FIG. 3, the HMD 330 is then separated into a left half and a right half such that the first portion of the combined signal 340(1) is displayed to the only the left eye 310(1) and the second portion of the combined signal 340(2) is displayed only to the right eye 310(2).

The lenses 320(1) and 320(2) are standard lenses used to project video images onto retinas. In some implementations, the HMD 330 includes a set of goggles in which each lens 320(1) and 320(2) is embedded in a respective eye hole in the goggles.

As described above, the noise that is combined with the video signal has a sufficiently small amplitude so as to be undetectable on its own to the viewer (e.g., viewer 108). That is, the eyes 310(1) and 310(2) each have a threshold amplitude above which a light signal may be detected. Adding the undetectable (i.e., subthreshold) noise to the video signal then increases the dynamic range of the detection mechanisms of the eyes 310(1) and 310(2).

When the left noise differs from the right noise, the the perceived image is sharper than an image with the left noise and right noise being identical. Moreover, video signals that have subthreshold components may, with the introduction of the noise signals, become visible to the viewer.

As an illustration of the increase in dynamic range of the video signal with the introduction of a noise signal, consider the frequency distribution of the video and noise signals. The noise signal, with high likelihood, has a much larger amount of high-frequency content than does the video signal alone. In this way, the high frequencies introduced by the noise signal may give the viewer the appearance of an emphasis of fine details of an image formed by the combined signals 340(1) and 340(2). In this way, the dynamic range increase may simulate a resolution increase to the viewer. Such a simulated resolution increase can improve the viewer's experience using the VR system.

Figure 4:
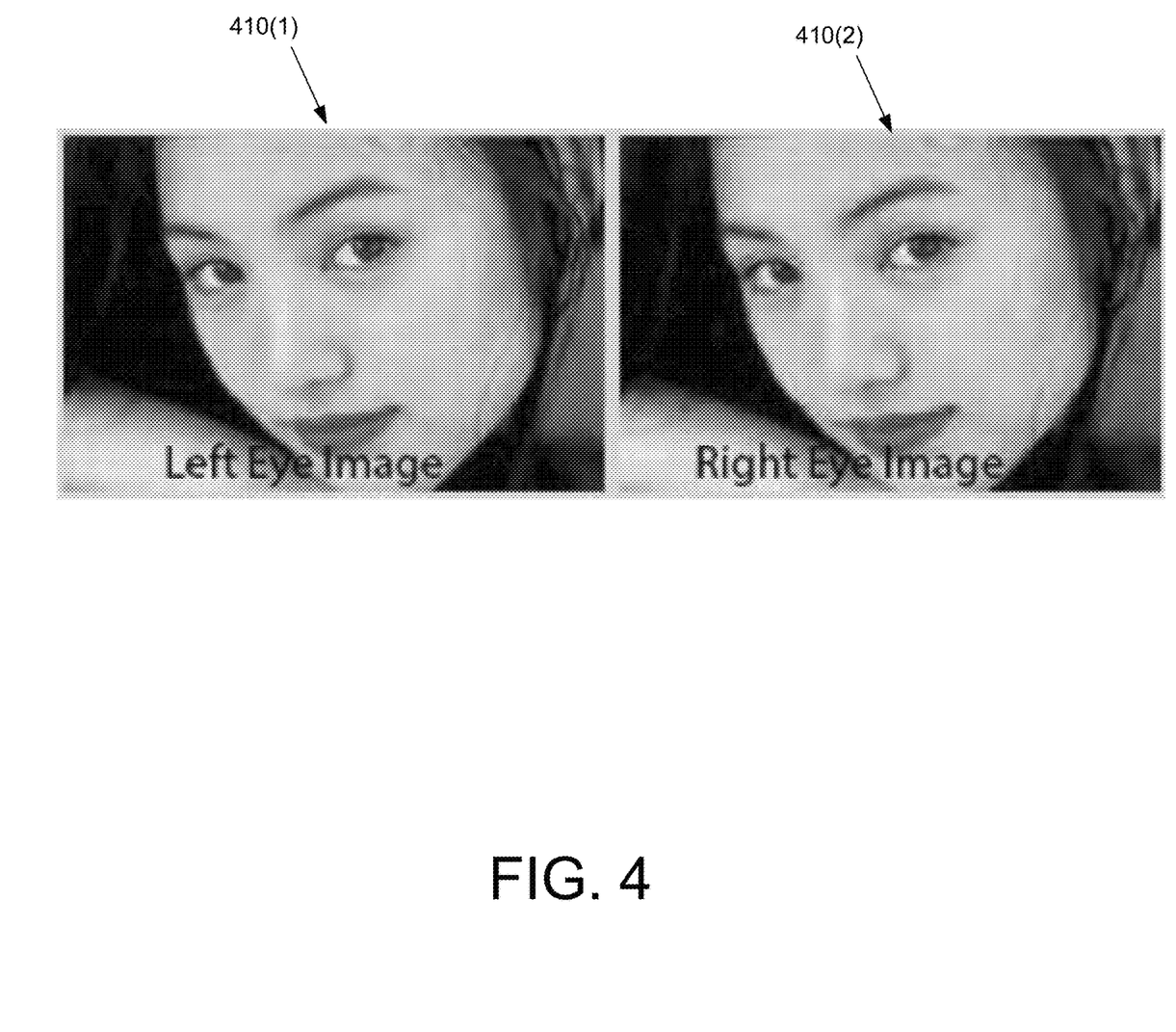
FIG. 4 is a diagram illustrating example left and right images with noise added.

FIG. 4 is a diagram illustrating an example left eye image 410(1) and an example right eye image 410(2) of a video frame with noise, i.e., left noise and right noise, added as described above. In this case, the left noise differs from the right noise. The images 410(1) and 410(2), despite the left noise and right noise each being undetectable, i.e., sub-threshold, on their own, when combined with the video signal produce noticeably different images. For example, the left side of the face in the image 410(1) appears sharper than the left side of the face in the image 410(2). As stated above, the sharpness or lack thereof of features in each picture depends upon the nature of the noise signal used for each eye.

Figure 5:
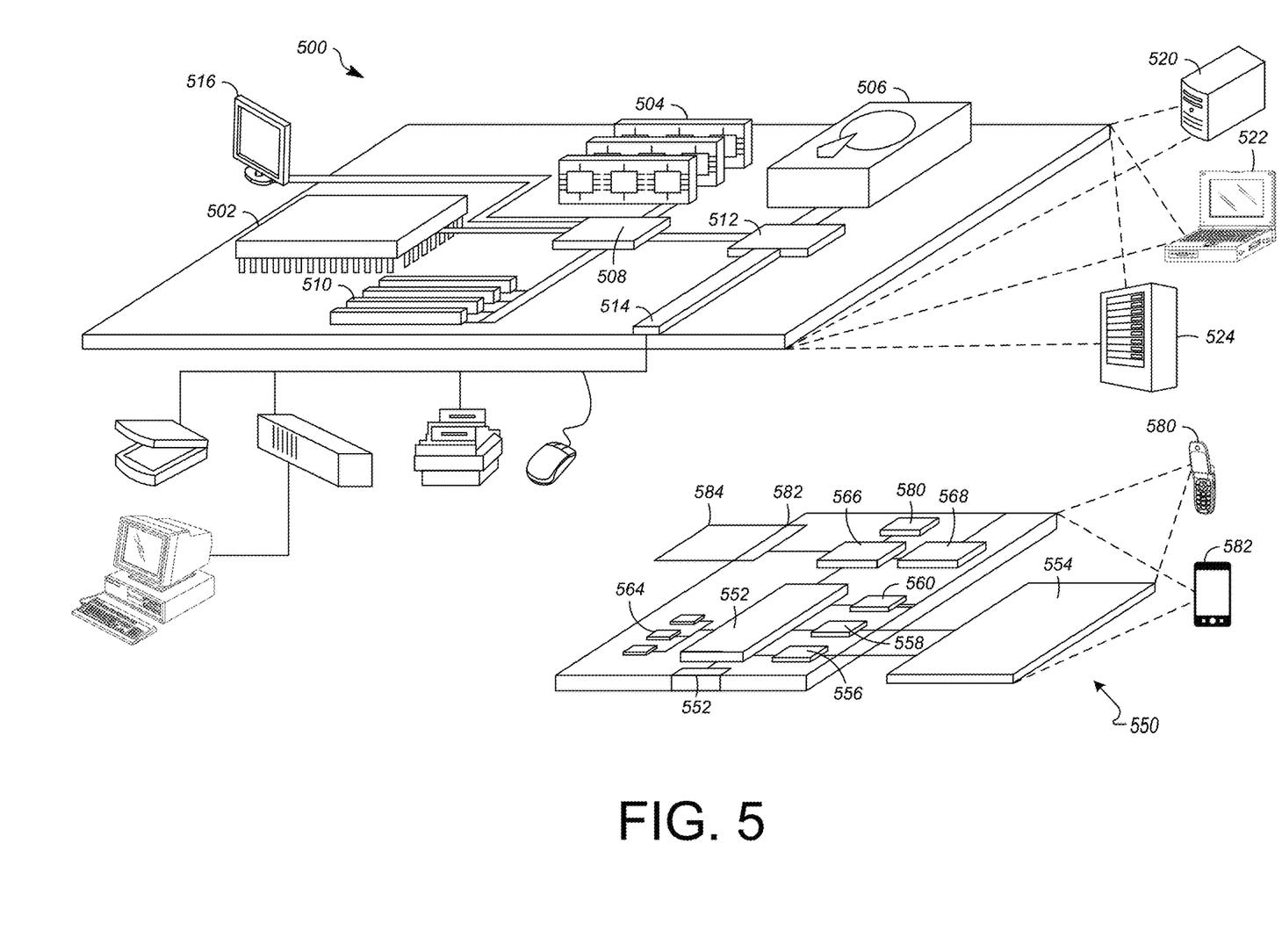
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 600. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Figure 6:
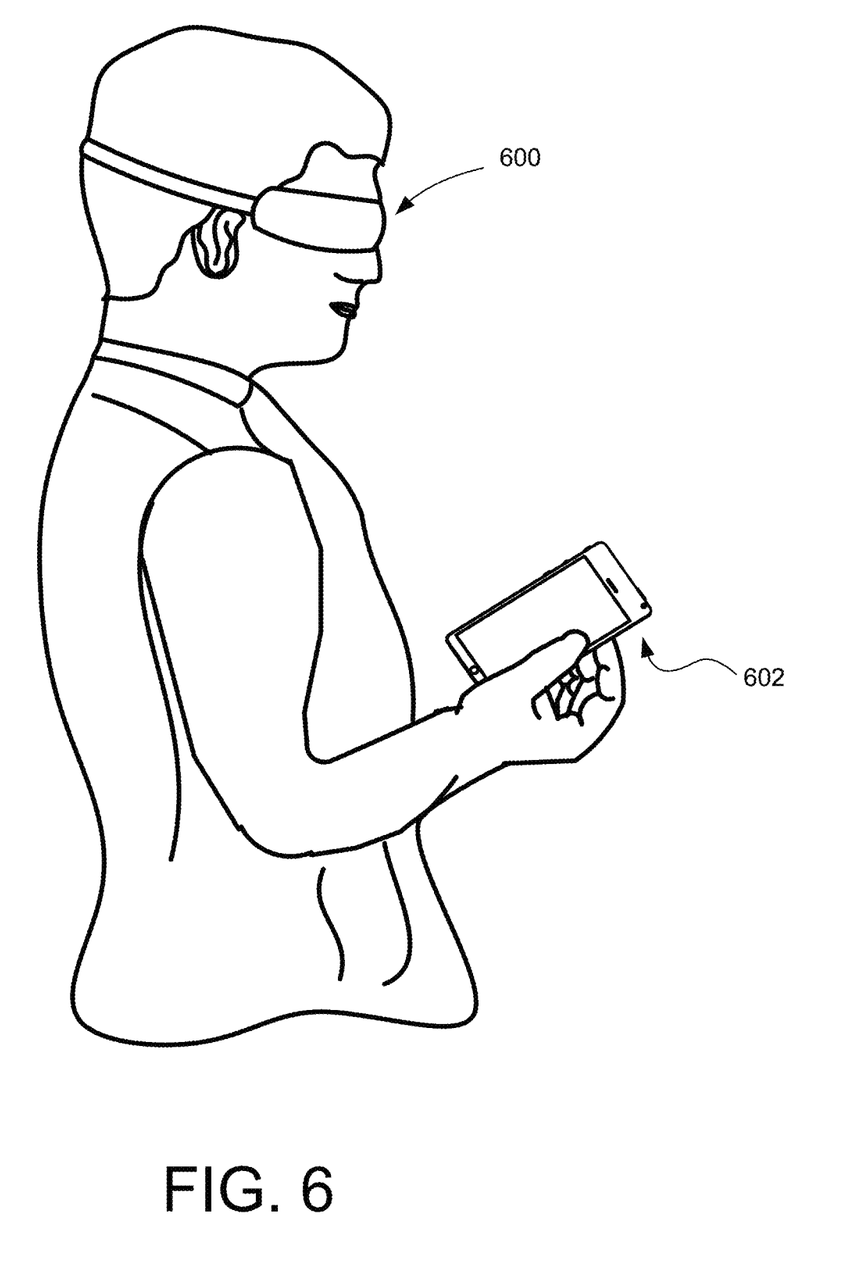
FIG. 6 is a diagram depicting an example VR head-mounted display (HMD).

FIG. 6 illustrates an example implementation of a head-mounted display. In FIG. 6, a user wearing an HMD 600 is holding a portable handheld electronic device 602. The handheld electronic device 602 may be, for example, a smartphone, a controller, a joystick, or another portable handheld electronic device(s) that may be paired with, and communicate with, the HMD 600 for interaction in the immersive virtual environment generated by the HMD 600. The handheld electronic device 602 may be operably coupled with, or paired with the HMD 600 via, for example, a wired connection, or a wireless connection such as, for example, a WiFi or Bluetooth connection. This pairing, or operable coupling, of the handheld electronic device 602 and the HMD 600 may provide for communication between the handheld electronic device 602 and the HMD 600 and the exchange of data between the handheld electronic device 602 and the HMD 700. This may allow the handheld electronic device 602 to function as a controller in communication with the HMD 600 for interacting in the immersive virtual environment generated by the HMD 700. That is, a manipulation of the handheld electronic device 702, such as, for example, a beam or ray emitted by the handheld electronic device 602 and directed to a virtual object or feature for selection, and/or an input received on a touch surface of the handheld electronic device 702, and/or a movement of the handheld electronic device 702, may be translated into a corresponding selection, or movement, or other type of interaction, in the immersive virtual environment generated by the HMD 700. For example, the HMD 700, together with the handheld electronic device 702, may generate a virtual environment as described above, and the handheld electronic device 602 may be manipulated to effect a change in scale, or perspective, of the user relative to the virtual features in the virtual environment as described above.

Figure 7A:
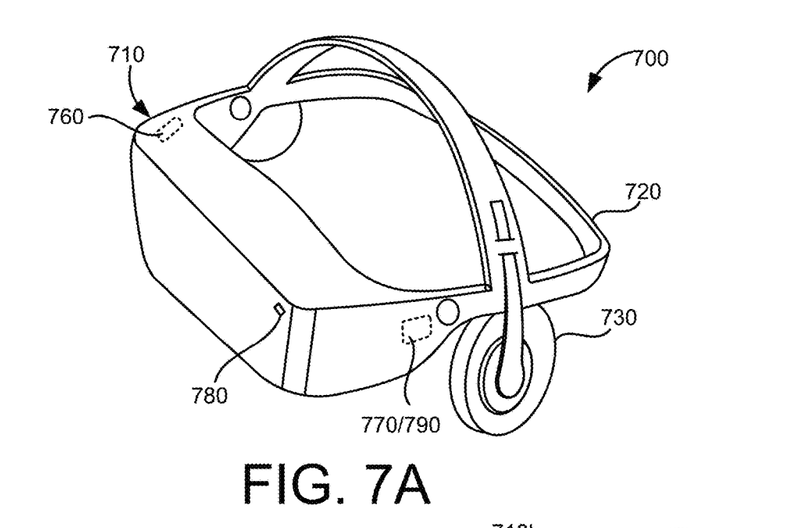
FIGS. 7A, 7B, and 7C are diagrams depicting the example VR HMD and controller.
Figures 7B, 7C:
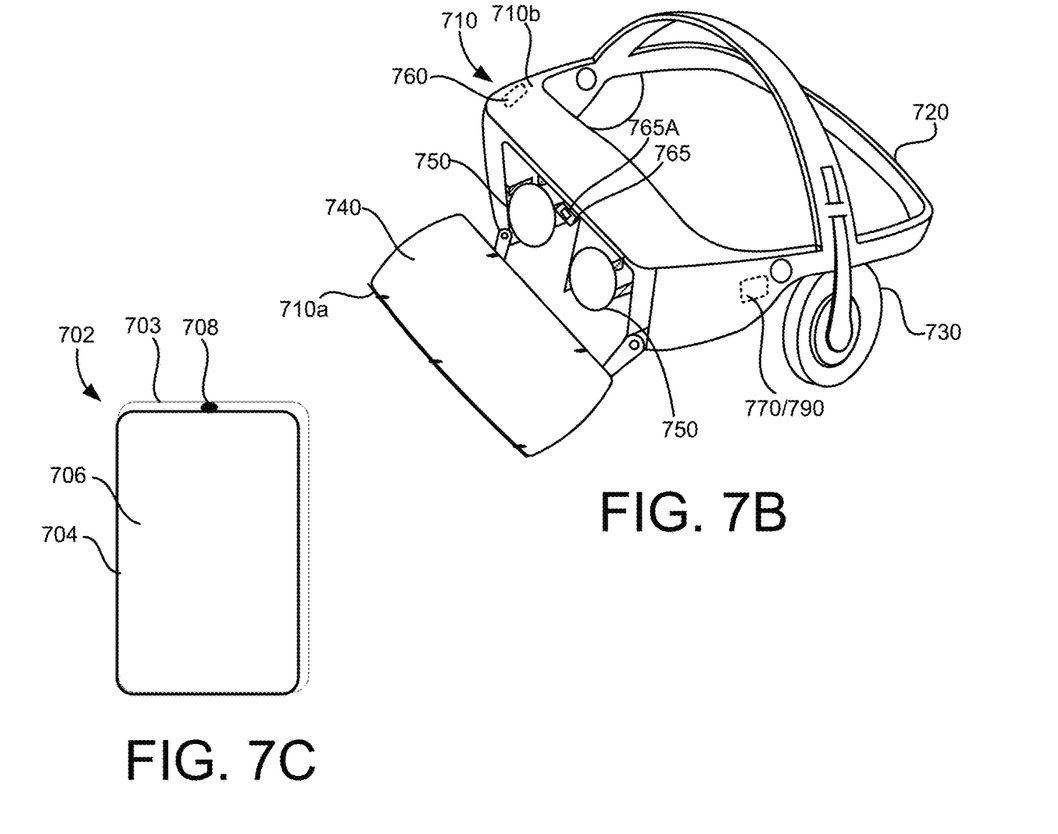

FIGS. 7A and 7B are perspective views of an example HMD, such as, for example, the HMD 600 worn by the user in FIG. 6, and FIG. 7C illustrates an example handheld electronic device, such as, for example, the handheld electronic device 602 shown in FIG. 6.

The handheld electronic device 702 may include a housing 703 in which internal components of the device 702 are received, and a user interface 704 on an outside of the housing 703, accessible to the user. The user interface 704 may include a touch sensitive surface 706 configured to receive user touch inputs. The user interface 704 may also include other components for manipulation by the user such as, for example, actuation buttons, knobs, joysticks and the like. In some implementations, at least a portion of the user interface 704 may be configured as a touchscreen, with that portion of the user interface 704 being configured to display user interface items to the user, and also to receive touch inputs from the user on the touch sensitive surface 706. The handheld electronic device 702 may also include a light source 708 configured to selectively emit light, for example, a beam or ray, through a port in the housing 703, for example, in response to a user input received at the user interface 704.

The HMD 700 may include a housing 710 coupled to a frame 720, with an audio output device 730 including, for example, speakers mounted in headphones, also be coupled to the frame 720. In FIG. 7B, a front portion 710a of the housing 710 is rotated away from a base portion 710b of the housing 710 so that some of the components received in the housing 710 are visible. A display 740 may be mounted on an interior facing side of the front portion 710a of the housing 710. Lenses 750 may be mounted in the housing 710, between the user's eyes and the display 740 when the front portion 710a is in the closed position against the base portion 710b of the housing 710. In some implementations, the HMD 700 may include a sensing system 760 including various sensors and a control system 770 including a processor 790 and various control system devices to facilitate operation of the HMD 700.

In some implementations, the HMD 700 may include a camera 780 to capture still and moving images. The images captured by the camera 780 may be used to help track a physical position of the user and/or the handheld electronic device 702 in the real world, or physical environment relative to the virtual environment, and/or may be displayed to the user on the display 740 in a pass through mode, allowing the user to temporarily leave the virtual environment and return to the physical environment without removing the HMD 700 or otherwise changing the configuration of the HMD 700 to move the housing 710 out of the line of sight of the user.

In some implementations, the HMD 700 may include a gaze tracking device 765 to detect and track an eye gaze of the user. The gaze tracking device 765 may include, for example, an image sensor 765A, or multiple image sensors 765A, to capture images of the user's eyes, for example, a particular portion of the user's eyes, such as, for example, the pupil, to detect, and track direction and movement of, the user's gaze. In some implementations, the HMD 700 may be configured so that the detected gaze is processed as a user input to be translated into a corresponding interaction in the immersive virtual experience.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, via controlling circuitry of a computer configured to output a video signal to a display, video frame data representing a video frame, the video frame having a first portion of pixels forming a first video signal and a second portion of pixels forming a second video signal, the first portion of pixels configured to be viewed in a first part of the display in a field of view (FOV) of a left eye of a viewer, the second portion of pixels configured to be viewed in a second part of the display in the FOV of a right eye of the viewer;

generating first noise data representing a first noise signal associated with each of the first portion of pixels and second noise data representing a second noise signal associated with each of the second portion of pixels;

performing, by the controlling circuitry, a combination operation on the first video signal and the first noise signal to produce a first combined signal and on the second video signal and the second noise signal to produce a second combined signal; and producing, via the controlling circuitry, the first combined signal for the first part of the display and the second combined signal for the second part of the display, thereby increasing a dynamic range by introducing high-frequencies in the first and second combined signals.

2. The method of claim 1, wherein each of the first noise signal and the second noise signal includes zero-mean Gaussian white noise.

3. The method of claim 2, wherein a variance of the zero-mean Gaussian white noise of the first noise signal is different from the variance of the zero-mean Gaussian white noise of the second noise signal.

4. The method of claim 1, wherein a correlation between the first noise signal and the second noise signal is smaller than a threshold.

5. The method of claim 1, wherein an amplitude of each of the first noise signal and the second noise signal is less than a level at which each of the first noise signal and the second noise signal may be detected by the viewer.

6. The method of claim 1, wherein the video frame is a first video frame,
wherein the video frame data further represents a second video frame, the second video being sampled at the first portion of pixels to form a third video signal and the second portion of pixels to form a fourth video signal,
wherein the method further comprises:
performing a combination operation on the third video signal and a third noise signal to produce a third combined signal and on the fourth video signal and a fourth noise signal to produce a fourth combined signal, the third noise signal being different from the first noise signal, the fourth noise signal being different from the second noise signal.

7. The method of claim 1, wherein the combination operation is performed during a rendering of the first video signal and the second video signal for output on the display.

8. The method of claim 1, wherein performing the combination operation includes:
summing the first video signal and the first noise signal and summing the second video signal and the second noise signal.

9. The method of claim 1, wherein the display is a head-mounted display (HMD) in a virtual reality system.

10. A computer program product comprising a non-transitory storage medium, the computer program product including code that, when executed by processing circuitry of a user device configured to output a video signal to a display, causes the processing circuitry to perform a method, the method comprising:
receiving video frame data representing a video frame, the video frame having a first portion of pixels forming a first video signal and a second portion of pixels forming a second video signal, the first portion of pixels configured to be viewed in a first part of the display in a field of view (FOV) of a left eye of a viewer, the second portion of pixels configured to be viewed in a second part of the display in the FOV of a right eye of the viewer;

generating first noise data representing a first noise signal associated with each of the first portion of pixels and second noise data representing a second noise signal associated with each of the second portion of pixels;

performing a combination operation on the first video signal and the first noise signal to produce a first combined signal and on the second video signal and the second noise signal to produce a second combined signal; and producing the first combined signal for the first part of the display and the second combined signal for the second part of the display, thereby increasing a dynamic range by introducing high-frequencies in the first and second combined signals.

11. The computer program product of claim 10, wherein each of the first noise signal and the second noise signal includes zero-mean Gaussian white noise.

12. The computer program product of claim 11, wherein a variance of the zero-mean Gaussian white noise of the first noise signal is different from the variance of the zero-mean Gaussian white noise of the second noise signal.

13. The computer program product of claim 10, wherein a correlation between the first noise signal and the second noise signal is smaller than a threshold.

14. The computer program product of claim 10, wherein an amplitude of each of the first noise signal and the second noise signal is less than a level at which each of the first noise signal and the second noise signal may be detected by the viewer.

15. The computer program product of claim 10, wherein the video frame is a first video frame,
wherein the video frame data further represents a second video frame, the second video being sampled at the first portion of pixels to form a third video signal and the second portion of pixels to form a fourth video signal,
wherein the method further comprises:
performing a combination operation on the third video signal and a third noise signal to produce a third combined signal and on the fourth video signal and a fourth noise signal to produce a fourth combined signal, the third noise signal being different from the first noise signal, the fourth noise signal being different from the second noise signal.

16. The computer program product of claim 10, wherein the combination operation is performed during a rendering of the first video signal and the second video signal for output on the display.

17. An electronic apparatus configured to output a video signal to a display, the electronic apparatus comprising:
memory; and
controlling circuitry coupled to the memory, the controlling circuitry being configured to:
receive video frame data representing a video frame, the video frame having a first portion of pixels forming a first video signal and a second portion of pixels forming a second video signal, the first portion of pixels configured to be viewed in a first part of the display in a field of view (FOV) of a left eye of a viewer, the second portion of pixels configured to be viewed in a second part of the display in the FOV of a right eye of the viewer;

generate first noise data representing a first noise signal associated with each of the first portion of pixels and second noise data representing a second noise signal associated with each of the second portion of pixels;

perform a combination operation on the first video signal and a first noise signal to produce a first combined signal and on the second video signal and a second noise signal to produce a second combined signal; and produce the first combined signal for the first part of the display and the second combined signal for the second part of the display, thereby increasing a dynamic range by introducing high-frequencies in the first and second combined signals.

18. The electronic apparatus of claim 17, wherein each of the first noise signal and the second noise signal includes zero-mean Gaussian white noise.

19. The electronic apparatus of claim 18, wherein a variance of the zero-mean Gaussian white noise of the first noise signal is different from the variance of the zero-mean Gaussian white noise of the second noise signal.

20. The electronic apparatus of claim 17, wherein a correlation between the first noise signal and the second noise signal is smaller than a threshold.

* * * * *